United States Patent
Fallah et al.

(10) Patent No.: US 7,613,942 B2
(45) Date of Patent: Nov. 3, 2009

(54) POWER MODE TRANSITION IN MULTI-THRESHOLD COMPLEMENTARY METAL OXIDE SEMICONDUCTOR (MTCMOS) CIRCUITS

(75) Inventors: Farzan Fallah, San Jose, CA (US); Afshin Abdollahi, Los Angeles, CA (US); Massoud Pedram, Beverly Hills, CA (US)

(73) Assignee: Fujitsu Limited, Kawasaki (JP)

(*) Notice: Subject to any disclaimer, the term of this patent is extended or adjusted under 35 U.S.C. 154(b) by 508 days.

(21) Appl. No.: 11/421,380

(22) Filed: May 31, 2006

(65) Prior Publication Data

US 2008/0133954 A1 Jun. 5, 2008

(51) Int. Cl.
*G06F 1/32* (2006.01)
(52) U.S. Cl. .............................. 713/323; 326/38; 716/2
(58) Field of Classification Search ................. 713/300, 713/323; 326/38; 716/2
See application file for complete search history.

(56) References Cited

OTHER PUBLICATIONS

A. Davoodi and A. Srivastava, "Wake-up Protocols for Controlling Current Surges in MTCMOS-based Technology," in Proceedings of Asia South Pacific Design Automation Conference, Jan. 2005.*
Kao et al., "Transistor Sizing Issues and Tool for Multi-Threshold CMOS Technology," Design Automation Conference, pp. 409-414, 1997.
Kao et al., "MTCMOS Hierarchical Sizing Based on Mutual Exlusive Discharge Patterns," Design Automation Conference, 6 pages, 1998.
Anis et al., "Dynamic and Leakage Power Reduction in MTCMOS Circuits Using an Automated Efficient Gate Clustering Technique," Design Automation Conference, 6 pages, 2002.
Kim et al., "Experimental Measurement of a Novel Power Gating Structure with Intermediate Power Save Mode," International Symposium on Low Power Electronics and Design, pp. 20-25, 2004.
Kim et al., "Understanding and Minimizing Ground Bounce During Mode Transition of Power Gating Structures," International Symposium on Low Power Electronics and Design, pp. 22-25, Aug. 25-27, 2003.
Won, Hyo-Sig et al., "An MTCMOS Design Methodology and Its Application to Mobile Computing," International Symposium on Low Power Electronics and Design, pp. 110-115, Aug. 25-27, 2003.
Usami et al., "Automated Selective Multi-Threshold Design for Ultra-Low Standby Applications," International Symposium on Low Power Electronics and Design, pp. 202-206, Aug. 12-14, 2002.
Johnson et al., "Leakage Control with Efficient Use of Transistor Stacks in Single Threshold CMOS," Design Automation Conference, 4 pages, 1999.
Cormen et al., "Introduction to Algorithms," 2nd ed. Cambridge, Massachussetts: MIT Press, 2001.

* cited by examiner

*Primary Examiner*—Chun Cao
*Assistant Examiner*—Albert Wang
(74) *Attorney, Agent, or Firm*—Baker Botts L.L.P.

(57) ABSTRACT

In one embodiment, a method for power mode transition in a multi-threshold complementary metal oxide semiconductor (MTCMOS) circuit includes clustering logic cells in the circuit to a number of logic clusters and optimizing wake-up times of the logic clusters to reduce a total turn-on time of the circuit while keeping below a predetermined threshold a sum of currents flowing from the circuit to ground, a sum of currents flowing from a supply voltage to the circuit, or both during a transition by the circuit from sleep mode to active mode.

18 Claims, 3 Drawing Sheets

POWER MODE TRANSITION IN MULTI-THRESHOLD COMPLEMENTARY METAL OXIDE SEMICONDUCTOR (MTCMOS) CIRCUITS

TECHNICAL FIELD OF THE INVENTION

This invention relates in general to integrated circuits and more particularly to power mode transition in MTCMOS circuits.

BACKGROUND OF THE INVENTION

The magnitude of supply/ground bounces, which arise from power mode transitions in power gating structures, may cause spurious transitions in a circuit. Such transitions may result in wrong values being latched in the circuit registers.

OVERVIEW

Particular embodiments of the present invention may reduce or eliminate problems and disadvantages associated with integrated circuits.

In one embodiment, a method for power mode transition in a multi-threshold complementary metal oxide semiconductor (MTCMOS) circuit includes clustering logic cells in the circuit to a number of logic clusters and optimizing wake-up times of the logic clusters to reduce a total turn-on time of the circuit while keeping below a predetermined threshold a sum of currents flowing from the circuit to ground, a sum of currents flowing from a supply voltage to the circuit, or both during a transition by the circuit from sleep mode to active mode.

Particular embodiments of the present invention may provide one or more technical advantages. As an example and not by way of limitation, particular embodiments limit the maximum value of supply/ground currents to a user-specified threshold level while minimizing wake-up time, e.g., sleep-to-active-mode transition time. Particular embodiments reduce or eliminate short-circuit current and spurious switching activity during wake-up time. Particular embodiments provide an efficient spatio-temporal solution with its supporting power gating structure, e.g., with the ability to turn on different logic cells in the circuit block at different times, which facilitates reduction of the wake-up time subject to an upper bound constraint on total maximum current through sleep transistors.

Particular embodiments may provide all, some, or none of these technical advantages. Particular embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which:

FIG. 4 illustrates example current flowing to ground in the inverter chain illustrated in FIG. 1 when the inverter chain is turned on;

DESCRIPTION OF EXAMPLE EMBODIMENTS

Multi-threshold CMOS (MTCMOS) technology provides low leakage and high performance operation by utilizing high speed, low $V_t$ transistors for logic cells, and low leakage, high $V_t$ devices as sleep transistors. Sleep transistors disconnect logic cells from the power supply and/or ground to reduce the leakage in sleep mode. In this technology, also called power gating, wake-up latency and power plane integrity are key concerns. Assuming a sleep/wake-up signal provided from a power management unit, an important issue is to minimize the time required to turn on the circuit upon receiving the wake-up signal, since the length of wake-up time can affect the overall performance of the VLSI circuit. Furthermore, the large current flowing to ground when sleep transistors are turned on can become a major source of noise on the power distribution network, which can in turn adversely impact the performance and/or functionality of the other parts of the circuit. There is often a trade-off between the amount of current flowing to ground and the transition time from the sleep mode to the active mode.

Particular embodiments reduce the transition time from sleep mode to active mode for a circuit part while assuring power integrity for the rest of the system by restricting the current that flows to ground during the transition. The problem is to minimize the wake-up time while constraining the current flowing to ground during the sleep to active mode transition. In particular embodiments, the discharge patterns of all logic cells are first obtained. Next, all cells in the circuit are clustered to a minimum number of clusters in such a way that the total discharge current of each cluster does not exceed a given threshold. Another constraint is imposed on clustering which will prevent flowing of short circuit current during wake-up time. This constraint is handled by introducing a constraint graph and not allowing two cells with an edge between them in the same cluster. Finally, for each cluster, a single sleep transistor is assigned which is associated with a limited performance penalty and for each sleep transistor, a sleep/wake-up signal is assigned. The wake-up times for the clusters are optimized to achieve minimum wake-up time while maintaining a given threshold on overall discharge current.

It is not necessary to have both NMOS and PMOS sleep transistors to encapsulate a logic cell. NMOS sleep transistors can be used to separate actual ground from virtual ground of the logic cell. When a circuit block enters sleep mode, the circuit block is disconnected from ground. This causes the voltage levels of some intermediate nodes in the circuit block to rise toward $V_{dd}$. When the circuit block is woken up, the nodes transition to zero. This transition in turn causes the logic cells in the immediate fanout of the node to carry a potentially large amount of short-circuit current as described below.

Figure 1:
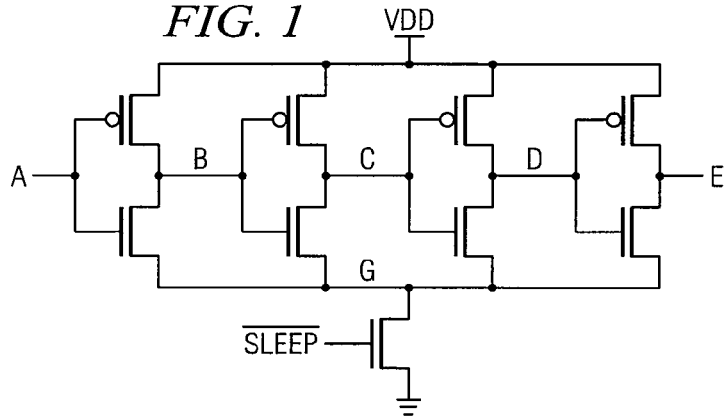
FIG. 1 illustrates an example inverter chain.
Figure 2:
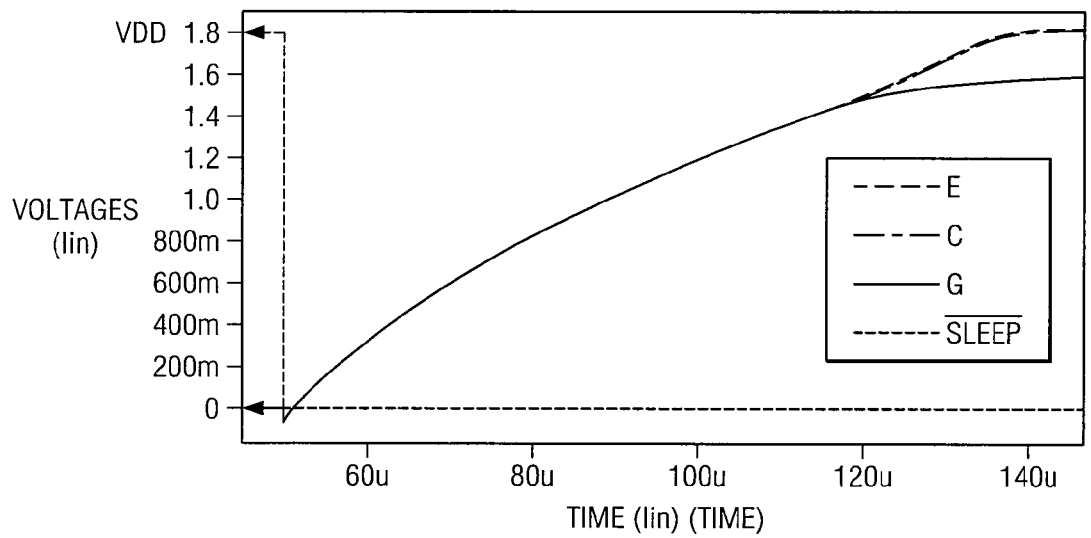
FIG. 2 illustrates example waveforms of nodes in the inverter chain illustrated in FIG. 1 when the inverter chain is in sleep mode.
Figure 3:
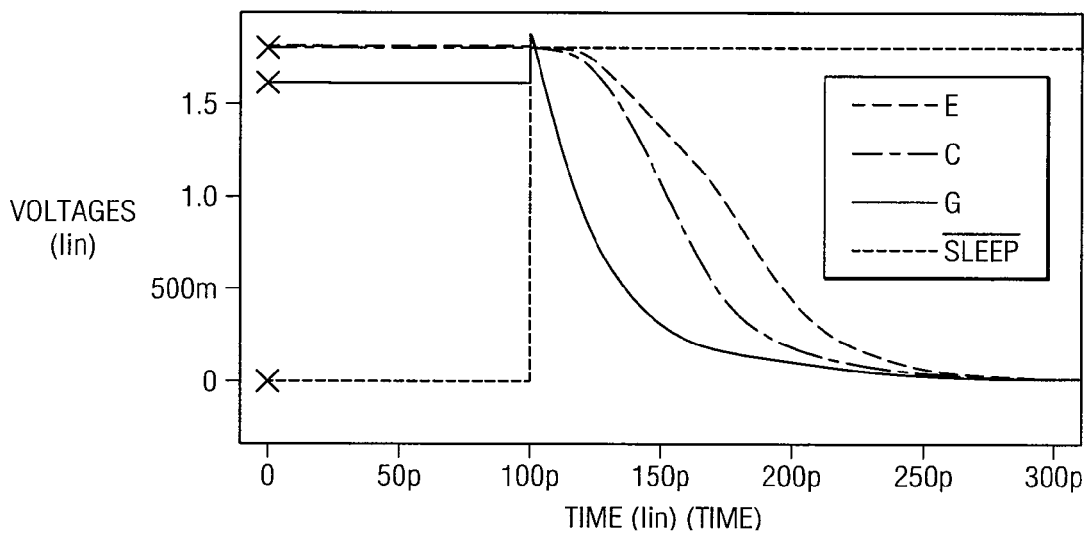
FIG. 3 illustrates example waveforms of nodes in the inverter chain illustrated in FIG. 1 when the inverter chain transitions from sleep mode to active mode.

As an example and not by way of limitation, consider the inverter chain illustrated in FIG. 1. The inverter chain is connected to ground through an NMOS sleep transistor. If the input of the circuit is low, then in the active mode (e.g., SLEEP=0) $V_A=V_C=V_E=V_G=0$ and $V_B=V_D=V_{DD}$. When entering the sleep mode, the voltages of B and D do not change, but the voltages of C, E, and G gradually increase and will be equal to $V_{DD}$ if the sleep period is long enough. (The driver of signal A is not controlled by the SLEEP signal.) This happens because the leakage through the PMOS transistors will charge up all the floating capacitances. FIG. 2 illustrates voltage waveforms of nodes C, E, and G generated by HSPICE simulation. While turning on the sleep transistor, nodes G, C, and E discharge as illustrated in FIG. 3. When the voltage of G reaches its final value, the voltages of C and E are still between zero and $V_{DD}$. This results in a significant amount of short-circuit current in the logic cells driven by nodes C and E, since these nodes turn on both transistors of the inverters present in their fanout.

Figure 4:
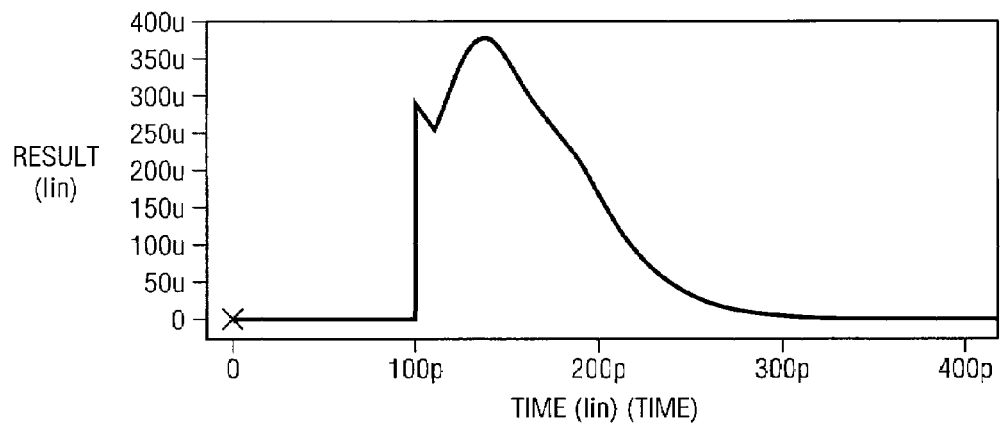

The current illustrated in FIG. 4 flowing through the sleep transistor is a result of not only discharging the accumulated charge in some intermediate nodes, e.g., C, E, and G in the inverter chain example, but also the short circuit current flowing through some logic cells of the circuit, e.g., the third inverter in the chain driven by signal C. When fewer nodes are discharged, less current flows to ground. Particular embodiments help avoid short-circuit currents and spurious transitions by appropriately clustering sleep transistors and turning on the sleep transistors at certain times. In particular embodiments, each cell is turned on only if the voltage levels of the logic cells in its fanin cell have already reached their final values.

Figure 5:
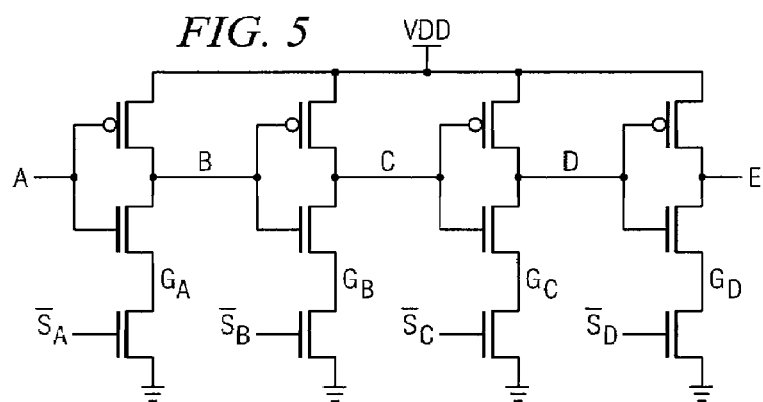
FIG. 5 illustrates an example inverter chain with one sleep transistor per cell.
Figure 6:
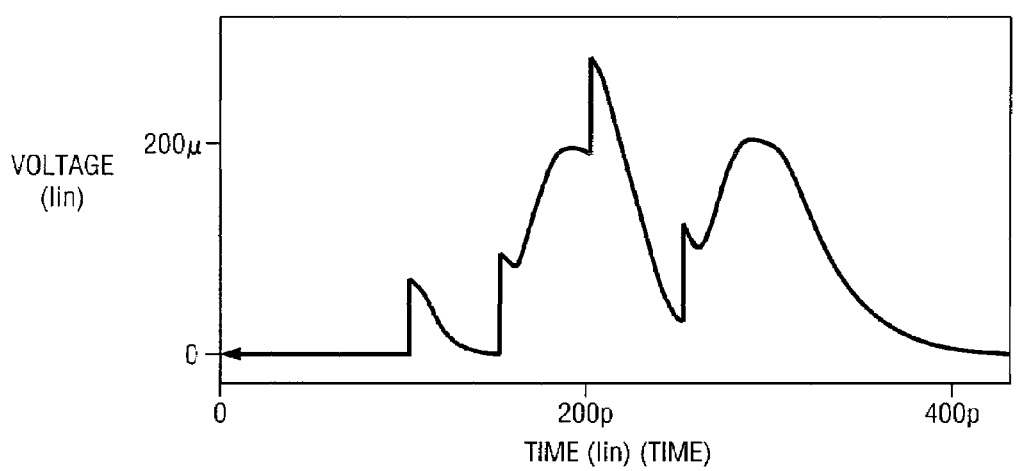
FIG. 6 illustrates example total current flowing to ground when the inverter chain illustrated in FIG. 5 is turned on according to a wake-up strategy.

FIG. 5 illustrates an example inverter chain with one sleep transistor per cell. If the sleep transistors are turned on one at a time starting from the first inverter on the left, the short-circuit current will be zero. When each cell is turned on, its fanout cell stays in sleep mode. Therefore, the possible transition of the output node of the logic cell does not result in short-circuit current in its fanout cell. Furthermore, there is no spurious transition in the circuit, since the inputs of the logic cells that have been turned on will not change at a later time. FIG. 6 illustrates example total current flowing to ground while turning on the circuit illustrated in FIG. 5 by employing this wake-up strategy. Compared with the data in FIG. 4, the maximum current in FIG. 6 is reduced from approximately 375 µA to approximately 280 µA.

There are several peaks in the current waveform illustrated in FIG. 6. This is due to the fact that the sleep transistors are turned on in four steps. This increases the wake-up time. The first and third inverters illustrated in FIG. 6 can be turned on simultaneously before turning on the second and forth inverters without producing short-circuit current, which reduces the wake-up delay of the circuit. In particular embodiments, a suitable algorithm applies this idea to a general combination circuit.

Let $I_{TURNON}$ be the waveform over time of the sum of currents flowing to ground during sleep to active mode transition. Particular embodiments cluster logic cells to a minimum number of clusters and also utilize a wake-up (turn-on) strategy, e.g., a scheduling of the sleep/wake-up signals to activate clusters of logic cells in the circuit, that minimizes turn-on time ($T_{TURNON}$) subject to a constraint on the maximum total current flowing through the sleep transistors, e.g., $MAX(I_{TURNON}) < I_{MAX}$, where the maximum is taken over all time instances. After the clustering phase, a sleep transistor and a corresponding sleep/wake-up signal is assigned to each cluster. The size of sleep transistors may be determined using any suitable method. It is assumed that the circuit has been in the sleep mode for a sufficiently long period of time (about 100 µs as illustrated in FIG. 2) so the output voltages of all its logic cells have raised to their final steady state level. Also, the vector applied to the circuit's primary inputs upon entering and during the sleep mode is known and remains fixed during the wake-up time. This input vector is the sleep vector. With these assumptions, the problem statement may be made:

Wake-up Signal Scheduling (WSS) Problem: Cluster the logic cells to minimum number of clusters and find the optimum wake-up times for logic clusters in the circuit so as to minimize the total turn-on time $T_{TURNON}$ while satisfying $I_{TURNON} < I_{MAX}$.

An algorithm, called wake-up scheduler (WS), may solve the problem stated above. In particular embodiments, WS includes the following steps:

1. Logic Cell Cluster Generator: Partition logic cells in the target circuit into a number of disjoint clusters $C_1, C_2, \ldots, C_M$ and assign one sleep transistor with one sleep/wake-up signal to all the cells in each cluster. A goal of clustering is to minimize the number of clusters M such that the total turn-on current flowing through the sleep transistors associated with each cluster $I_{TURNON}(C_i)$ does not exceed $I_{MAX}$.
2. Inter-Cluster Sleep Signal Scheduler: Consider a single sleep signal that drives the sleep transistor of a cluster. A goal of wake-up signal scheduling is to provide the ordering and relative timing of the activation signals for the M sleep signals in the circuit to minimize the overall wake-up time while limiting the total current flowing to ground to $I_{MAX}$.

Particular embodiments solve the WSS problem by solving each of the clustering and scheduling problems separately and sequentially. Since short-circuit currents can be avoided by an appropriate turn-on strategy which in turn reduces the total $I_{TURNON}$, clustering and scheduling may be carried out in a way that reduces or eliminates short-circuit currents. A constraint graph may be constructed to capture this requirement and used during clustering and scheduling steps. The constraint graph captures the zero short-circuit current requirement and may be used during the logic-cell clustering and sleep-signal scheduling steps.

The constraint graph $G(V, E)$ is a Weighted Directed Acyclic Graph. Each vertex $v_i$ in the graph corresponds to a logic cell in the circuit. There is a directed edge $e(v_i, v_j)$ from $v_i$ to $v_j$ if and only if $v_j$ is in the fanout of $v_i$ and the output of $v_i$ transitions from 1 to 0 during the circuit turn-on time under the specified sleep vector. In addition, there is a positive weight, $w(i, j)=T_{SETTLE}(v_i)$, associated with each edge $e(v_i, v_j)$, where $T_{SETTLE}(v_i)$ is the time required for the output of cell $v_i$ to settle to its final value when its sleep transistor is turned on. $T_{SETTLE}(v_i)$ values are calculated by circuit simulation as follows. If the primary sleep vector is known and each logic cell is turned on only after all its fanin cells are turned on, the input values of the logic cell will be known at the time it is turned on. Therefore, the cell can be simulated under the specific sleep-vector value to find $T_{SETTLE}(v_i)$ and the current profile of the cell, e.g., $I_{TURNON}(v_i)$, after its sleep transistor is turned on, e.g., SLEEP=0. To ensure that there will be no short circuit current, the following constraint on graph G is enforced: if nodes $v_i$ and $v_j$ are in the same cluster $C_k$, there should be no directed path between $v_i$ and $v_j$, and vice versa.

If there is an edge $e(v_i, v_j)$ where both $v_i$ and $v_j$ are in the same cluster, their corresponding cells will be turned on at the same time. However, the output of node $v_i$ will be making a downward transition. Hence, short-circuit current will flow through cell $v_j$. This constraint implies that there should not be a path between two nodes in a cluster going through nodes outside the cluster, as described below. The constraint on the sleep signal scheduling step can be described more clearly if a new directed graph $G_C$, called the cluster constraint graph, is defined. The vertices of this graph correspond to the clusters $C_1, C_2, \ldots, C_M$. There is an edge from $C_i$ to $C_j$ in $G_C$ if and only if there is at least one edge from some node of $C_i$ to some node of $C_j$ in the original constraint graph G. There is a positive weight associated with each edge in $G_C$. The edge weight may be calculated as follows: $w(C_K, C_L) = \max\{w(v_i, v_j) | v_i \in C_K, v_j \in C_L\}$.

Figure 7:
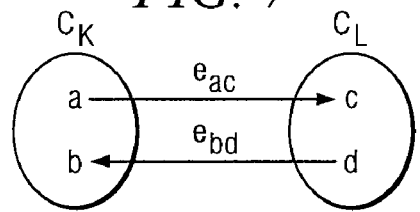
FIG. 7 illustrates an example cyclic constraint graph.

Although G is acyclic (assuming combinational logic circuits) there is no guarantee that a clustering solution will result in an acyclic $G_C$. FIG. 7 illustrates an example cyclic constraint graph, where there is a cycle between clusters $C_K$ and $C_L$. $C_K$ and $C_L$ cannot be scheduled to avoid short-circuit current. If $C_L$ is turned on after $C_K$, a cell $v_a \in C_L$ will drive another cell $v_b \in C_K$ which is already on. Therefore, cell $v_b$ will consume short-circuit current. A similar problem arises if $C_L$ is turned on first. Hence the cluster constraint graph should be acyclic.

The constraint imposed on the sleep-signal scheduling by the presence of edge $e(C_K, C_L)$ in $G_C$ is $T_{ON}(C_K) + W(C_K, C_L) \leq T_{ON}(C_L)$, where $T_{ON}(C_K)$ and $T_{ON}(C_L)$ are the turn-on times of clusters $C_K$ and $C_L$, respectively. Using the above information, the clustering problem may be defined as follows.

Logic Cell Clustering (LCC) Problem: Partition logic cells $v_1, v_2, \ldots, v_N$ into a minimum number M of clusters $C_1, C_2, \ldots, C_M$ such that there is no cycle in $G_C$ and $\text{MAX}(I_{TURNON}(C_K)) \leq I_{MAX}$ for all k, where $$I_{TURNON}(C_K) = \sum_{v_i \in C_k} I_{TURNON}(v_i).$$

In the above definition, summation is pointwise and MAX is taken over time. $I_{TURNON}(C_K)$ and $I_{TURNON}(v_i)$ represent the turn-on current waveforms, not scalar current values.

Particular embodiments apply the following algorithm to the LCC problem:

| | |
|---|---|
| 1 | For all cells $v_i$ in the circuit do { |
| 2 |     For all clusters $C_K$ created so far do { |
| 3 |         If adding $v_i$ to cluster $C_K$ creates a cycle in $G_C$ or violates the $I_{MAX}$ threshold for $C_K$ |
| 4 |         Then continue with the next cluster (goto 2); |
| 5 |         Else {add $v_i$ to cluster $C_k$; update $G_C$; continue with the next cell (goto 1);} } |
| 6 |     Create a new cluster and add $v_i$ to it; Update $G_C$; } |

One goal is to minimize the number of clusters in order to reduce the number of sleep signals that are required in the power-gating structure, which will simplify the power management circuitry. While one sleep signal per cluster may seem costly, a sleep-signal tree (which is an inverter tree) similar to a clock tree may drive large sleep transistors used in power gating structures. It is therefore possible to generate different timing for sleep signals going to different clusters by simply inserting delay elements (buffers) into the sleep-signal tree.

Sleep-Signal Scheduling (SSS) Problem: Determine $T_{ON}(C_K)$ values to minimize the total turn-on time subject to $\text{MAX}(I_{TURNON}(C_K)) \leq I_{MAX}$ and $T_{ON}(C_K) + e(C_K, C_L) \leq T_{ON}(C_L)$ constraints.

For a given ordering of clusters, $T_{ON}(C_1) < \ldots < T_{ON}(C_K) < T_{ON}(C_{K+1}) < \ldots < T_{ON}(C_M)$, it may be possible to shift the current waveforms of two clusters $I_{TURNON}(C_K)$ and $I_{TURNON}(C_{K+1})$ to overlap one another without violating the constraint $I_{TURNON} < I_{MAX}$. The question is how close $T_{ON}(C_K)$ and $T_{ON}(C_{K+1})$ can be scheduled without violating the $I_{MAX}$ constraint. To address this problem, $G_C$ can be augmented with a new set of weighted directed edges $d(C_K, C_{K+1})$ as follows:

$$d(C_K, C_{K+1}) = \min\{\Delta T\} s.t.$$

$$\max\{I_{TURNON}(C_K) + \text{shift}[I_{TURNON}(C_{K+1}), \Delta T]\} < I_{MAX}$$

Figure 8:
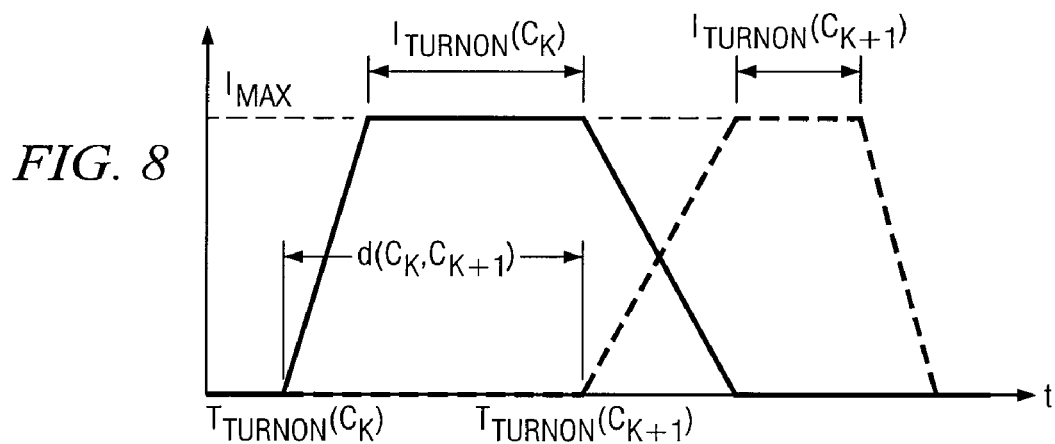
FIG. 8 illustrates an example shifted waveform.

Above, $\text{shift}[I_{TURNON}(C_{K+1}), \Delta T]$ is the waveform $I_{TURNON}(C_{K+1})$ shifted right on the time axis by the amount $\Delta T$, as illustrated in FIG. 8.

Next, edge weights $w(C_K, C_L)$ and $d(C_K, C_L)$ are combined with each other to construct new edge weights, which capture both constraints: $f(C_K, C_L) = \max\{w(C_K, C_L), d(C_K, C_L)\}$. For the given ordering of clusters, the minimum turn-on time can be described as $$\sum_{k=1}^{M-1} f(C_K, C_{k+1}) + T_{SETTLE}(C_M),$$

which is the weight of a path in graph $G_C$ with edges $f(C_K, C_L)$ going through each vertex exactly once plus $T_{SETTLE}(C_M) = \max\{T_{SETTLE}(v_i) | v_i \in C_M\}$, where $T_{SETTLE}(V_i)$ is the time required for the output of cell $v_i$ to settle during the turn on time. To consider the settling time of the last cluster, a dummy vertex $C_D$ is added to the graph with no outgoing edges and the following incoming edges, $f(C_K, C_D) = T_{SETTLE}(C_K)$ for all K. The WSS problem is restated, "Find the minimum weighted directed Hamiltonian path on graph $G_C$ with edges $f(C_K, C_L)$."

A Hamiltonian path is a path including all vertices of a graph once. A Hamiltonian path of the graph with a dummy node $C_D$ should end at $C_D$, which has no outgoing edges. There are many heuristics for solving the minimum Hamiltonian path problem, which is an NP-complete problem. However, because the number of clusters is usually small even for a large circuit, using an exhaustive search for solving the minimum Hamiltonian path is feasible. The scheduling step results in the optimal turn-on times, $T_{TURNON}(C_K)$ for a given ordering of clusters. If the number of clusters is small, it is possible to exhaustively try all possible orderings, and thereby find the best ordering. Otherwise, an ordering of clusters can be arbitrarily or heuristically selected. One heuristic may be as follows: Select an arbitrary cluster $C_1$ as the first cluster to be scheduled to wake-up. Next, find the next cluster $C_2$ that minimizes $d(C_1, C_i)$, e.g., $d(C_1, C_2) \leq d(C_1, C_i)$ for every i, and continue in the same way, e.g., at step k: $d(C_k, C_{k+1}) \leq d(C_k, C_i)$. In particular embodiments, the shape of current profile of clusters is very similar and, therefore, the initial ordering used in the algorithm is not important. In particular embodiments, by changing the value of the maximum current bound, the wake-up time may be reduced.

Figure 9:
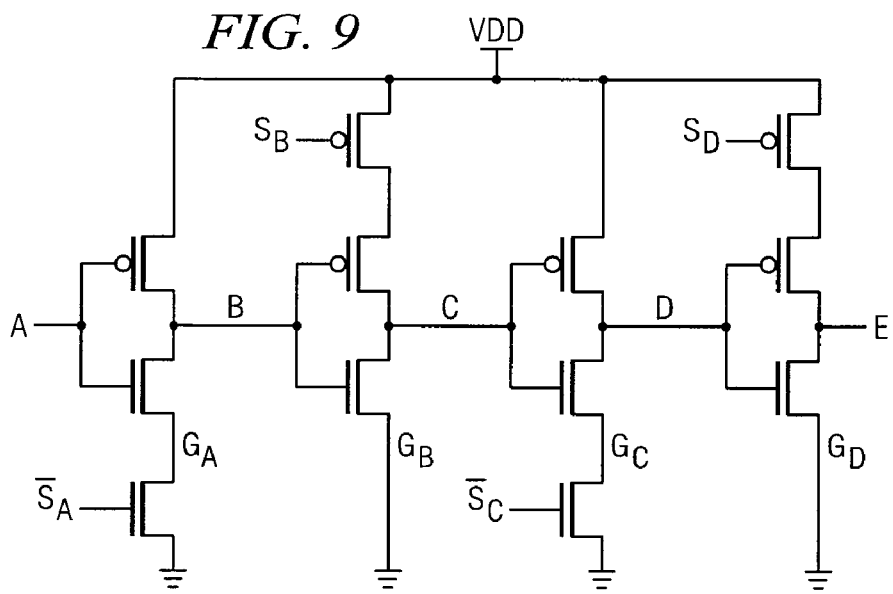
FIG. 9 illustrates an example inverter chain with a PMOS sleep transistor disconnecting an output from $V_{dd}$.

As described above, short-circuit current may be avoided when turning on a circuit. Another approach to reducing or eliminating short-circuit current during the wake-up is to judiciously use an NMOS or a PMOS sleep transistor for each logic cell in the circuit. This technique may be called Input-driven Sleep Transistor Typing (ISTT). For the given sleep vector, if the output of a logic cell in the circuit is logic 1, an NMOS sleep transistor will be used to disconnect that cell from the ground; otherwise, a PMOS sleep transistor will be used to disconnect the output from $V_{dd}$, as illustrated in FIG. 9.

This ISST algorithm may ensure that every logic cell uses the type of the sleep transistor that minimizes leakage current through the off-path of the logic cell through a sleep transistor induced stack effect. As a result, the output of every logic cell under the given sleep vector is driven to a hard zero or one logic level. Therefore, no logic cell will have a floating output node, which would have resulted in intermediate signal values changing during the sleep mode thereby causing a potentially large short-circuit current during transition to the wake-up mode. Furthermore, in this case, the only floating nodes in the circuit are some of the internal nodes of logic cells, e.g., the shared diffusion area between source of the NMOS driver transistor and drain of the NMOS sleep transistor in the first stage of the inverter chain illustrated in FIG. 9. These internal floating nodes may change during the sleep mode and therefore there will be some current dissipation on wake-up time to recover their correct values. However, this current is significantly less than the current that will flow through the circuit when only NMOS sleep transistors are used. In the latter case, not only some of the internal nodes of logic gates are floating, but also, on average, approximately half of the output nodes of the logic cells (which typically drive larger capacitances) will be floating. Therefore, the peak current on circuit wake-up tends to be significantly larger than the case with ISST.

A shortcoming of using NMOS sleep transistors for some gates and PMOS for others is that the delay overhead in the active mode is potentially twice that of the case with only NMOS sleep transistors. In ISTT, the delays of all logic cells on the critical path of a circuit are degraded, whereas the delays of only half of the logic cells are degraded when all sleep transistors are NMOS type. It is possible to combine the ISST technique with the WS technique to achieve even better results by scattering in time the current that must flow to the ground, thereby, reducing the peak current: ISST+WS.

Particular embodiments reduce wake-up time and maximum current flowing to ground for power gating structures. In particular embodiments, one technique for reducing wake-up time and maximum current flowing to ground for power gating structures is based on effectively clustering logic cells and scheduling wake-up signals for the clusters to achieve the mentioned objectives. Particular embodiments have been used to describe the present invention. A person having skill in the art may comprehend one or more changes, substitutions, variations, alterations, or modifications to the particular embodiments used to describe the present invention that are within the scope of the appended claims. The present invention encompasses all such changes, substitutions, variations, alterations, and modifications.

What is claimed is:

1. A method comprising:
constructing a first weighted directed acyclic graph representing a zero short-circuit current requirement of a multi-threshold complementary metal oxide semiconductor (MTCMOS) circuit comprising a plurality of logic cells, the first weighted directed acyclic graph comprising one or more first vertices and one or more first edges, each first vertex corresponding to one of the logic cells, each first edge linking two first vertices to each other;
assigning to each of one or more of the first edges one or more first weights based on a settling time of a logic cell corresponding to a vertex linked by the first edge;
constructing a second weighted directed acyclic graph comprising one or more second vertices and one or more second edges, each second vertex corresponding to a logic cluster comprising one or more of the logic cells;
assigning to each of one or more of the second edges second weights based on the first weights;
determining third weights based at least in part on the second weights;
applying the third weights to the second edges;
determining a minimum weighted directed Hamiltonian path on the second directed acyclic graph with the third weights applied to the second edges;
based at least in part on the determined minimum weighted directed Hamiltonian path:
clustering the logic cells into a new clustering; and
setting wake-up times of logic clusters in the new clustering to reduce a total turn-on time of the circuit while keeping below a predetermined threshold a first sum of first currents flowing from the circuit to ground, a second sum of second currents flowing from a supply voltage to the circuit, or both during a transition by the circuit from sleep mode to active mode.

2. The method of claim 1, wherein clustering the logic cells in the circuit comprises partitioning the logic cells into a number of disjoint logic clusters and assigning one sleep transistor to all logic cells in each cluster.

3. The method of claim 2, wherein one or more first ones of the sleep transistors are N-channel metal oxide semiconductor (NMOS) sleep transistors and one or more second ones of the sleep transistors are positive-channel metal oxide semiconductor (PMOS) sleep transistors.

4. The method of claim 3, wherein the NMOS sleep transistors are assigned to gates having output equal to one in sleep mode and the PMOS sleep transistors are assigned to gates having output equal to zero.

5. The method of claim 1, wherein clustering logic cells in the circuit comprises, for each logic cell:
adding the logic cell to a previously generated logic cluster if adding the logic cell to the previously generated logic cluster does not create a cycle in a cluster constraint graph corresponding to the circuit and does not cause a current flowing from the generated logic cluster to ground when the generated logic cluster is turned on;
otherwise generating a new logic cluster and adding the logic cell to the new logic cluster.

6. The method of claim 1, wherein optimizing wake-up times of the logic clusters comprises determining a sleep-signal schedule for the logic clusters.

7. The method of claim 6, wherein the sleep-signal schedule shifts current waveforms of logic clusters to overlap without causing the sum of currents flowing from the circuit to ground during a transition by the circuit from sleep mode to active mode to exceed the predetermined threshold.

8. The method of claim 1, wherein clustering the logic cells in the circuit and optimizing the wake-up times of the logic clusters substantially eliminates short-circuit currents from the circuit.

9. Logic encoded in one or more computer-readable tangible media for execution and when executed operable to:
construct a first weighted directed acyclic graph representing a zero short-circuit current requirement of a multi-threshold complementary metal oxide semiconductor (MTCMOS) circuit comprising a plurality of logic cells, the first weighted directed acyclic graph comprising one or more first vertices and one or more first edges, each first vertex corresponding to one of the logic cells, each first edge linking two first vertices to each other;

assign to each of one or more of the first edges one or more first weights based on a settling time of a logic cell corresponding to a vertex linked by the first edge;

construct a second weighted directed acyclic graph comprising one or more second vertices and one or more second edges, each second vertex corresponding to a logic cluster comprising one or more of the logic cells;

assign to each of one or more of the second edges second weights based on the first weights;

determine third weights based at least in part on the second weights;

apply the third weights to the second edges;

determine a minimum weighted directed Hamiltonian path on the second directed acyclic graph with the third weights applied to the second edges;

based at least in part on the determined minimum weighted directed Hamiltonian path:
cluster the logic cells into a new clustering; and
set wake-up times of logic clusters in the new clustering to reduce a total turn-on time of the circuit while keeping below a predetermined threshold a first sum of first currents flowing from the circuit to ground, a second sum of second currents flowing from a supply voltage to the circuit, or both during a transition by the circuit from sleep mode to active mode.

10. The logic of claim 9, operable to cluster the logic cells in the circuit by partitioning the logic cells into a number of disjoint logic clusters and assigning one sleep transistor to all logic cells in each cluster.

11. The logic of claim 10, wherein one or more first ones of the sleep transistors are N-channel metal oxide semiconductor (NMOS) sleep transistors and one or more second ones of the sleep transistors are positive-channel metal oxide semiconductor (PMOS) sleep transistors.

12. The logic of claim 11, wherein the NMOS sleep transistors are assigned to gates having output equal to one in sleep mode and the PMOS sleep transistors are assigned to gates having output equal to zero 13. The logic of claim 9, operable to clustering logic cells in the circuit comprises by, for each logic cell:
adding the logic cell to a previously generated logic cluster if adding the logic cell to the previously generated logic cluster does not create a cycle in a cluster constraint graph corresponding to the circuit and does not cause a current flowing from the generated logic cluster to ground when the generated logic cluster is turned on;
otherwise generating a new logic cluster and adding the logic cell to the new logic cluster.

14. The logic of claim 9, operable to optimize wake-up times of the logic clusters by determining a sleep-signal schedule for the logic clusters.

15. The logic of claim 14, wherein the sleep-signal schedule shifts current waveforms of logic clusters to overlap without causing the sum of currents flowing from the circuit to ground during a transition by the circuit from sleep mode to active mode to exceed the predetermined threshold.

16. The logic of claim 9, operable to substantially eliminates short-circuit currents from the circuit by clustering the logic cells in the circuit and optimizing the wake-up times of the logic clusters.

17. A multi-threshold complementary metal oxide semiconductor (MTCMOS) circuit comprising:
a number of logic clusters, each logic cluster comprising one or more logic cells of the circuit;
the logic clusters having optimized wake-up times that reduce a total turn-on time of the circuit while keeping below a predetermined threshold a sum of currents flowing from the circuit to ground, a sum of currents flowing from a supply voltage to the circuit, or both during a transition by the circuit from sleep mode to active mode;
the clustering of the logic cells in the circuit and the optimization of the wake-up times of the logic clusters substantially eliminating short-circuit currents from the circuit, the clustering and optimization comprising:
constructing a first weighted directed acyclic graph representing a zero short-circuit current requirement of a multi-threshold complementary metal oxide semiconductor (MTCMOS) circuit comprising a plurality of logic cells, the first weighted directed acyclic graph comprising one or more first vertices and one or more first edges, each first vertex corresponding to one of the logic cells, each first edge linking two first vertices to each other;
assigning to each of one or more of the first edges one or more first weights based on a settling time of a logic cell corresponding to a vertex linked by the first edge;
constructing a second weighted directed acyclic graph comprising one or more second vertices and one or more second edges, each second vertex corresponding to a logic cluster comprising one or more of the logic cells;
assigning to each of one or more of the second edges second weights based on the first weights;
determining third weights based at least in part on the second weights;
applying the third weights to the second edges;
determining a minimum weighted directed Hamiltonian path on the second directed acyclic graph with the third weights applied to the second edges;
based at least in part on the determined minimum weighted directed Hamiltonian path:
clustering the logic cells into a new clustering; and
setting wake-up times of logic clusters in the new clustering to reduce a total turn-on time of the circuit while keeping below a predetermined threshold a first sum of first currents flowing from the circuit to ground, a second sum of second currents flowing from a supply voltage to the circuit, or both during a transition by the circuit from sleep mode to active mode.

18. A system comprising:
means for constructing a first weighted directed acyclic graph representing a zero short-circuit current requirement of a multi-threshold complementary metal oxide semiconductor (MTCMOS) circuit comprising a plurality of logic cells, the first weighted directed acyclic graph comprising one or more first vertices and one or more first edges, each first vertex corresponding to one of the logic cells, each first edge linking two first vertices to each other;
means for assigning to each of one or more of the first edges one or more first weights based on a settling time of a logic cell corresponding to a vertex linked by the first edge;
means for constructing a second weighted directed acyclic graph comprising one or more second vertices and one or more second edges, each second vertex corresponding to a logic cluster comprising one or more of the logic cells;
means for assigning to each of one or more of the second edges second weights based on the first weights;

means for determining third weights based at least in part on the second weights;
means for applying the third weights to the second edges;
means for determining a minimum weighted directed Hamiltonian path on the second directed acyclic graph with the third weights applied to the second edges;
means for, based at least in part on the determined minimum weighted directed Hamiltonian path:
  clustering the logic cells into a new clustering; and
  setting wake-up times of logic clusters in the new clustering to reduce a total turn- on time of the circuit while keeping below a predetermined threshold a first sum of first currents flowing from the circuit to ground, a second sum of second currents flowing from a supply voltage to the circuit, or both during a transition by the circuit from sleep mode to active mode.

* * * * *